US012423949B2

(12) United States Patent
Kundu et al.

(10) Patent No.: US 12,423,949 B2
(45) Date of Patent: Sep. 23, 2025

(54) KNOWLEDGE DRIVEN PRE-TRAINED FORM KEY MAPPING

(71) Applicant: Microsoft Technology Licensing, LLC, Redmond, WA (US)

(72) Inventors: Souvik Kundu, Kirkland, WA (US); Jianwen Zhang, Shoreline, WA (US); Kaushik Chakrabarti, Bellevue, WA (US); Yuet Ching, Bellevue, WA (US); Leon Romaniuk, Snohomish, WA (US); Zheng Chen, Bellevue, WA (US); Cha Zhang, Bellevue, WA (US); Neta Haiby, Los Altos, CA (US); Vinod Kurpad, Bothell, WA (US); Anatoly Yevgenyevich Ponomarev, Sammamish, WA (US); Alexander T. Gorevski, Redmond, WA (US); Mengya Hu, Redmond, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 374 days.

(21) Appl. No.: 18/059,943

(22) Filed: Nov. 29, 2022

(65) Prior Publication Data
US 2024/0071047 A1 Feb. 29, 2024

Related U.S. Application Data

(60) Provisional application No. 63/402,930, filed on Aug. 31, 2022.

(51) Int. Cl.
*G06V 10/764* (2022.01)
(52) U.S. Cl.
CPC .................. *G06V 10/764* (2022.01)

(58) Field of Classification Search
CPC .. G06V 10/764; G06V 30/42; G06V 2201/10; G06F 40/30; G06F 16/355;
(Continued)

(56) References Cited

U.S. PATENT DOCUMENTS 10,867,171 B1 12/2020 Contryman et al.
10,872,236 B1 12/2020 Elor et al.
(Continued)

FOREIGN PATENT DOCUMENTS

WO 2021041722 A1 3/2021
WO 2021050170 A1 3/2021

OTHER PUBLICATIONS

"International Search Report and Written Opinion issued in PCT Application No. PCT/US23/028295", Mailed Date: Oct. 24, 2023, 13 Pages.

*Primary Examiner* — Michael S Osinski
(74) *Attorney, Agent, or Firm* — Foley IP Law, PLLC

(57) ABSTRACT

The disclosure herein describes generating input key-standard key mappings for a form. A set of input key-value pairs are received, and a subset of candidate form types are determined from a set of form types using the input key-value pairs. A set of standard keys associated with the determined subset of candidate form types are obtained. A set of input key-standard key pairs are generated using the set of input key-value pairs and the obtained set of standard keys and the set of input key-standard key pairs are narrowed using a narrowing rule. Ranking scores for each input key-standard key pair of the narrowed set of input key-standard key pairs are generated. Each input key of the set of input key-vale pairs is mapped to a standard key of the set of standard keys using at least the generated ranking scores of the narrowed set of input key-standard key pairs.

14 Claims, 10 Drawing Sheets

(58) Field of Classification Search
CPC ............. G06F 16/212; G06F 16/24535; G06F 16/3329; G06F 16/3344; G06F 16/3347; G06F 16/36; G06F 40/20; G06F 40/205; G06N 3/045; G06N 20/00; G06N 3/08; G06N 20/20; G06N 3/042; G06N 3/084; G06N 20/10
See application file for complete search history.

(56) References Cited

U.S. PATENT DOCUMENTS

| | | | |
|---|---|---|---|
| 11,227,183 B1 * | 1/2022 | Connors | G06F 18/2113 |
| 11,694,460 B1 * | 7/2023 | Luo | G06N 3/044 |
| | | | 382/176 |
| 11,714,968 B2 * | 8/2023 | Batra | G06N 5/045 |
| | | | 704/9 |
| 11,880,655 B2 * | 1/2024 | Tensmeyer | G06F 40/284 |
| 11,947,914 B2 * | 4/2024 | Tang | G06N 3/045 |
| 12,008,026 B1 * | 6/2024 | Sanz | G06F 16/3347 |
| 2015/0242393 A1 * | 8/2015 | Zaragoza | G06F 40/10 |
| | | | 704/9 |
| 2015/0309990 A1 * | 10/2015 | Allen | G06F 40/177 |
| | | | 704/9 |
| 2018/0018576 A1 * | 1/2018 | Boyer | G06F 16/355 |
| 2020/0160050 A1 | 5/2020 | Bhotika et al. | |
| 2021/0026897 A1 * | 1/2021 | Rathje | G06F 16/90332 |
| 2021/0065042 A1 * | 3/2021 | Gopalan | G06N 3/045 |
| 2021/0201014 A1 | 7/2021 | Wu | |
| 2021/0350516 A1 * | 11/2021 | Tang | G06F 16/93 |
| 2021/0406716 A1 | 12/2021 | Broyles et al. | |
| 2022/0375246 A1 * | 11/2022 | Akabe | G06F 40/216 |
| 2023/0080674 A1 * | 3/2023 | Attali | G06F 40/56 |
| 2023/0117206 A1 * | 4/2023 | Venkateshwaran | G06Q 40/08 |
| | | | 704/9 |
| 2024/0232539 A1 * | 7/2024 | Venkateshwaran | G06N 3/044 |
| 2024/0242026 A1 * | 7/2024 | Agatsuma | G06F 40/247 |
| 2025/0094718 A1 * | 3/2025 | Yan | G06F 40/30 |

* cited by examiner

KNOWLEDGE DRIVEN PRE-TRAINED FORM KEY MAPPING

CROSS-REFERENCE TO RELATED APPLICATION

This application claims priority to U.S. Provisional Patent Application No. 63/402,930, entitled "MAPPING FORM KEYS TO STANDARD KEYS OF A FORM TYPE USING A TRAINED MODEL," filed on Aug. 31, 2022, the disclosure of which is incorporated herein by reference in its entirety.

BACKGROUND

Existing Document Understanding services scan an input form document (e.g., Bank Statement Form, W-2 Form, etc.) and extract out the fields, or keys, and values. Form Recognizers (FRs) and associated applications are used to configure rules mapping an extracted key to their corresponding format of key in their own system. For instance, in a bank system, the format "EIN" is used instead of "Employee Identification Number (EIN)" and an FR must be configured to recognize the "EIN" key and convert it to the "Employee Identification Number (EIN)" key. In this way, downstream applications can automate the process of scanning various form documents into their application systems. This makes FRs a critical step in Digital Transformation age. However, for different form documents, different versions of the same form document, or the same form document provided by different parties, different key formats are used. These differences create widescale issues, as there are many different types of form documents, versions, and many different keys and possible variants and downstream applications are very difficult or impossible to configure with comprehensive mapping rules.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for generating input key-standard key mappings for a form is described. A set of input key-value pairs associated with the form are received and a subset of candidate form types are determined from a set of form types using the set of input key-value pairs. A set of standard keys associated with the determined subset of candidate form types are obtained. A set of input key-standard key pairs are generated using the set of input key-value pairs and the obtained set of standard keys and the set of input key-standard key pairs are narrowed using a narrowing rule. Ranking scores for each input key-standard key pair of the narrowed set of input key-standard key pairs are generated. Each input key of the set of input key-vale pairs is mapped to a standard key of the set of standard keys using at least the generated ranking scores of the narrowed set of input key-standard key pairs.

A system for training a key mapping model is described. A key mapping model is trained using a trained based language model and domain-specific text training data that is specific to a domain of form types. Then, the key mapping model is trained using paired key data of form types in the domain as training data. Finally, the key mapping model is fine-tuned using labeled mappings.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 10, the systems are illustrated as schematic drawings. The drawings may not be to scale.

DETAILED DESCRIPTION

Figure 1:
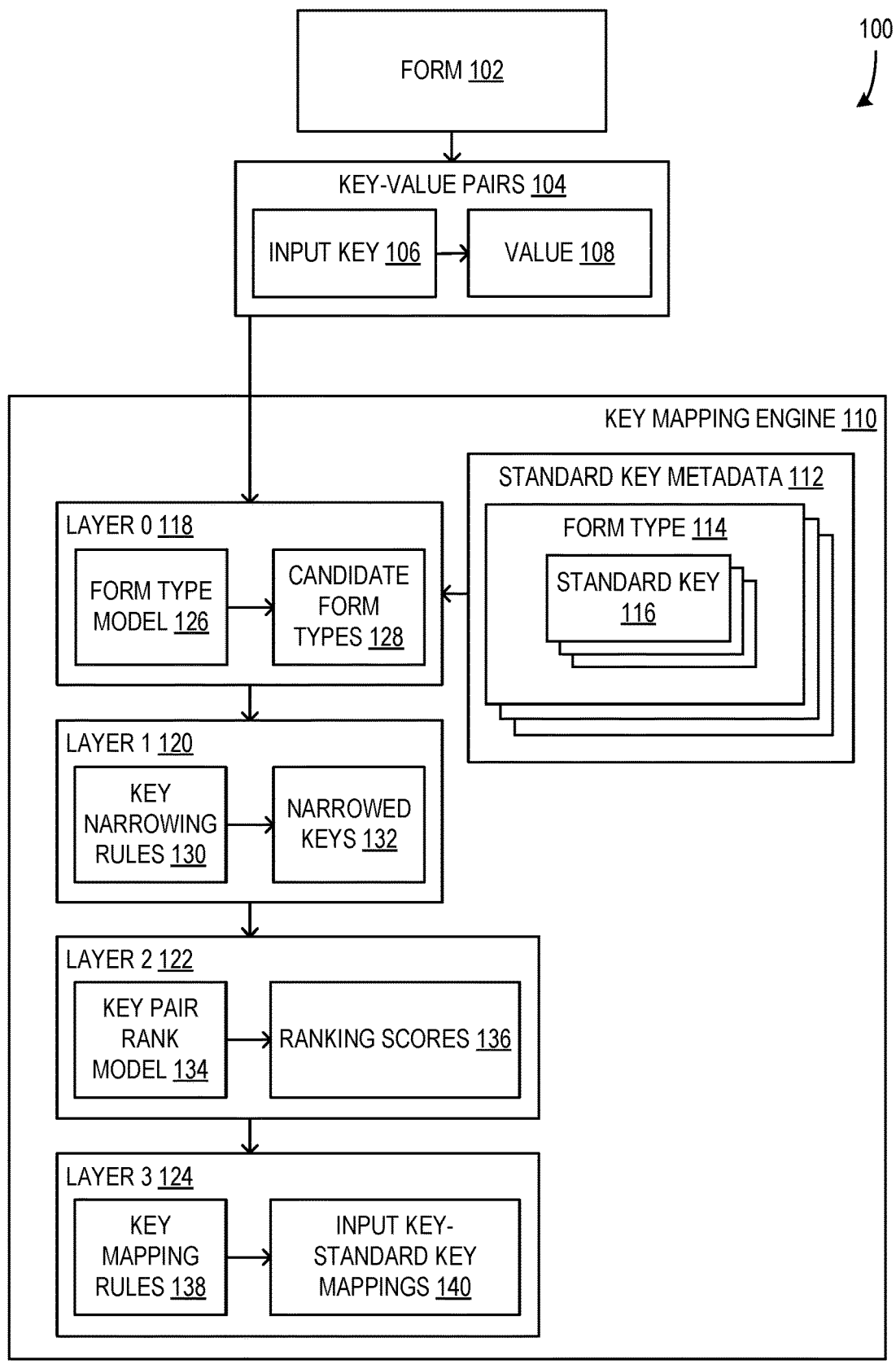
FIG. 1 is a block diagram illustrating a system configured for automatically mapping input keys to standard keys.

Aspects of the disclosure provide a computerized method and system for mapping key character strings of a form document to standardized keys of one of several form types. The disclosure describes receiving a set of input key-value pairs associated with a form and determining a subset of candidate form types from a set of form types based on that set of input key-value pairs. A set of standard keys associated with the determined subset of candidate form types is combined with the set of input key-value pairs to generate a set of input key-standard key pairs. The set of input key-standard key pairs is then narrowed using a narrowing rule. A trained model is then used to generate ranking scores for each input key-standard key pair of the narrowed set of pairs and, using the generated ranking scores, each input key is mapped to a standard key.

Existing Document Understanding services scan an input form document (e.g., Bank Statement Form, W-2 Form, etc.) and extract out the fields, or keys, and values, (e.g., [{"Key": "Employee Identification Number (EIN)", "Value": "A123"}]). Form Recognizers (FRs) and associated applications are used to configure rules mapping an extracted key to their corresponding format of key in their own system. For instance, in a bank system, the format "EIN" is used instead of "Employee Identification Number (EIN)" and an FR must be configured to recognize the "EIN" key and convert it to the "Employee Identification Number (EIN)" key. In this way, downstream applications can automate the process of scanning various form documents into their application systems. This makes FRs a very critical step in Digital Transformation age.

However, there is a common challenge in this story. For different form documents, different versions of a same form document, or the same form document but provided by different parties, different key formats are used. For instance, to express the concept of "Employee Identification Number", there are popular various ways such as "Employee ID", "Employee ID No.", "EIN No.", etc. These differences can create widescale issues, as there are many different types of form documents, versions, and many different keys and possible variants. Downstream applications are very difficult or impossible to configure with comprehensive mapping rules. Further, these issues block FR services from being widely adopted in various document process automation applications.

The disclosed systems and methods are directed to resolving this challenge. The disclosure includes constructing a Knowledge Graph containing popular standard formats of keys (e.g., "standard keys") and developing machine learning models and associated processes to automatically mapping an extracted key (e.g., a "Custom Key" or "Input Key") to a Standard Key. The disclosed mapping processes provide high accuracy and consistency in that input keys from a wide variety of different forms that express the same semantic concept are mapped to the same standard key. Then, other downstream applications are enabled to rely on the presence of the standard keys in data that is being processed.

The disclosure operates in an unconventional manner at least by using a model trained using machine learning techniques to map input keys to standard keys as described herein. Such a trained model enables the disclosure to comprehensively classify input keys of a wide variety of different forms without creating explicit mapping rules, which would be impractical or impossible. Thus, the breadth of forms to which the disclosure can be applied is a significant improvement over other implementations and, in many cases, the execution of a trained model to map input keys of a form to standard keys is more efficient with respect to time spent and resources expended than a brute force application of large quantities of explicit mapping rules.

Further, the disclosure improves the performance of the described key mapping model by narrowing down candidate standard keys in several ways. First, the disclosure describes the use of a trained model to identify a subset of candidate form types from a larger set of possible form types. By reducing the quantity of form types that are initially considered, the quantity of possible standard keys that are processed by the key mapping model is substantially reduce, thus greatly reducing the time and resources spent to execute the disclosed processes. Second, the disclosure describes the application of narrowing rules to the input keys in order to match some input keys to standard keys without analysis by the key mapping model. Because the model is configured to analyze every pair of remaining input key and candidate standard key, eliminating a couple input keys from being analyzed by the model can reduce the total quantity of pairs to be analyzed by significant quantities. This stage also reduces the time and resources spent to execute the key mapping model as described herein.

Additionally, a crucial feature of the disclosure is that the key mapping model is pre-trained to be applicable to all domains and form types. While the disclosed system may be initially configured to support a smaller quantity of domains and form types, the disclosure is configured to enable more domains and/or form types to be supported. In many cases, the key mapping models need not be retrained for newly added domains and/or form types due to the breadth of training data used to train the models initially. This enables the disclosure to be used by many different types of customers or other downstream applications, enhances the general flexibility of the described system, and reduces time and effort required to adapt the disclosure for use with new domains or form types.

Further, the disclosure describes training the key mapping model using standard keys for a wide range of popular domains and/or forms. The training process makes use of unique, advanced data collection assets to build a massive and scalable Knowledge Graph of standard keys, enhancing the quantity of different customers that can use the disclosure with their forms as described herein.

Still further, the disclosure describes a scalable offline training process of the key mapping model. The stagewise training data collection and pre-training/fine-tuning strategy is unconventional and provides high quality training on important domains and form types and flexible generalization capability over widespread domains and form types as well.

FIG. 1 is a block diagram illustrating a system 100 configured for automatically mapping input keys to standard keys. In some examples, key value pairs 104 are extracted or otherwise obtained from a form 102 and provided to a key mapping engine 110. The key mapping engine 110 includes or has access to standard key metadata 112, including form types 114 and associated standard keys 116. Further, the key mapping engine 110 includes four processing layers: layer 0 118, layer 1 120, layer 2 122, and layer 3 124. The processing layers 118-124 use the standard key metadata 112 to process the key-value pairs 104 in order to map the input keys 106 to standard keys 116 in the form of input key-standard key mappings 140.

Figure 10:
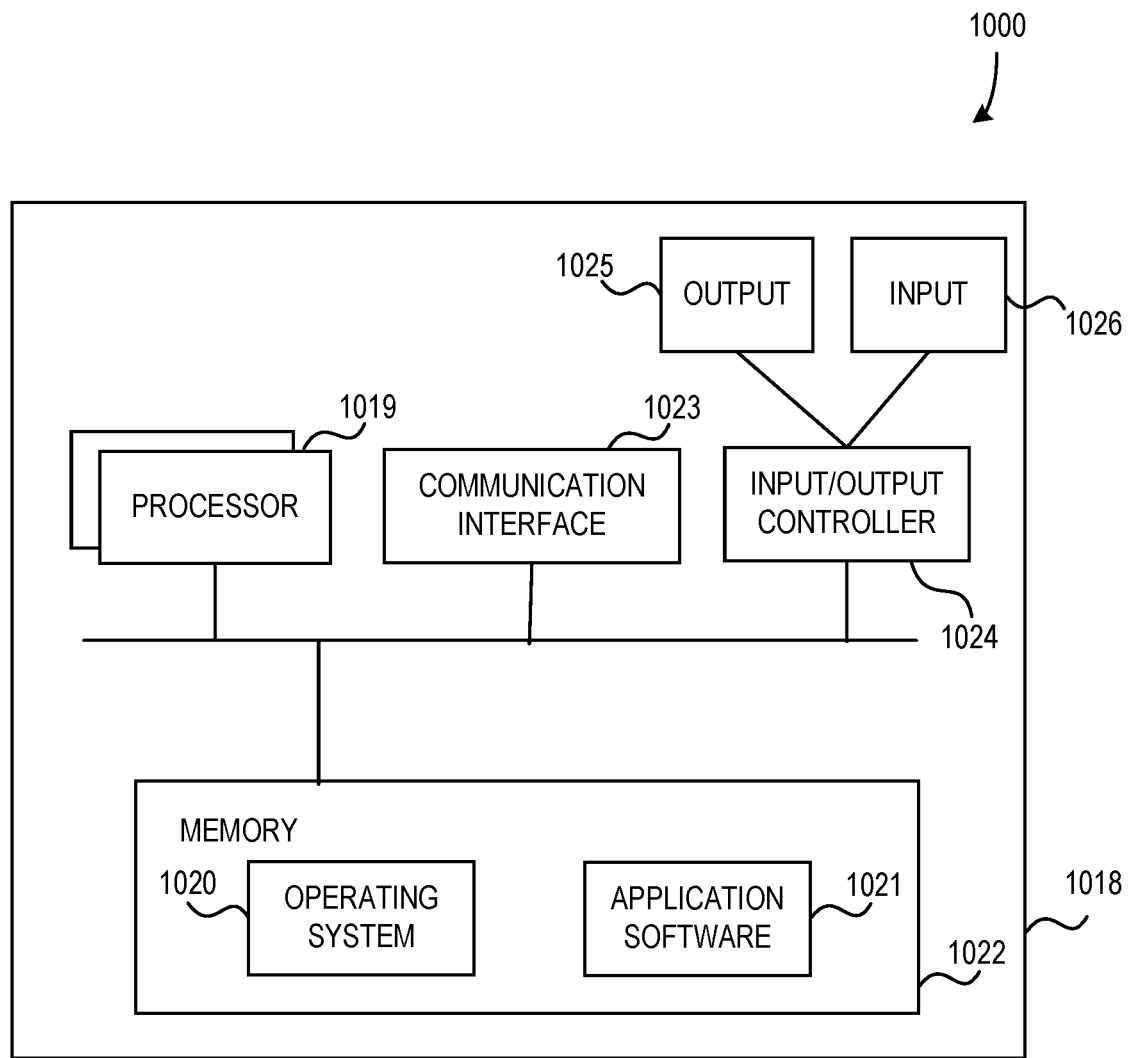
FIG. 10 illustrates an example computing apparatus as a functional block diagram.

In some examples, the system 100 includes a computing device (e.g., the computing apparatus of FIG. 10). Further, in some examples, the system 100 includes multiple computing devices that are configured to communicate with each other via one or more communication networks (e.g., an intranet, the Internet, a cellular network, other wireless network, other wired network, or the like). In some such examples, entities of the system 100 are configured to be distributed between the multiple computing devices and to communicate with each other via network connections. For instance, in an example, different layers 118-124 of the key mapping engine 110 are distributed across multiple computing devices. The different layers 118-124 are then configured to communicate with each other via a network connection as described herein.

In some examples, the form 102 is an electronic form, such as a form that is displayed on a website or a form provided in a document format such as the Portable Document Format (PDF). The key-value pairs 104 of the form 102 are extracted or otherwise obtained from the form 102 by scanning the form 102 with a Form Recognizer (FR) application or the like. In some such examples, FR applications are configured to read text data and/or capture image data of the form and to interpret the read or captured data to identify input keys 106 of the form 102 and values 108 associated with those input keys 106. For instance, in an example, a form 102 includes a field that is labeled with the word 'Name' and the field is filled out to include the name 'Anita'. In this case, an FR application is configured to identify the word 'Name' as an input key 106 and the name 'Anita' as a value 108, forming a key value pair 104.

Further, in some examples, the input keys 106 and values 108 are stored and/or sent as character strings, other text data formats, or other types of data formats that can be analyzed using language models as described herein. Additionally, or alternatively, the input keys 106 and/or values 108 are stored and/or sent as integers or other non-text formats without departing from the description. In some such examples, the key mapping engine 110 or another entity in the system 100 are configured to convert the non-text format input keys 106 and/or values 108 into a text format that is compatible with the operations that are performed by the key mapping engine 110 as described herein.

In some examples, the key mapping engine 110 receives the key-value pairs 104 and maps the input keys 106 to standard keys 116 of the standard key metadata 112 as described herein. The standard key metadata 112 includes a set of different form types 114 and associated standard keys 116 of those form types 114. For instance, in an example, there is a form type 114 that is used by a business to record some information about employees, and forms of this form type 114 include a key that represents the Employee Identification Number (EIN). In such an example, the standard key 116 associated with the EIN is defined as the character string TIN', but on some forms of this form type 114, other character strings are used. For instance, various forms of the same or similar form types 114 use 'Employee ID', 'Employee ID No.', 'Employee Identification Number', 'Et No.', or the like as input keys 106. The key mapping engine 110 uses the operations described herein to automatically and accurately determine that each of these input keys 106 on forms 102 should map to the standard key 116 of 'EIN' in the input key-standard key mappings 140.

Further, in some examples, the different form types 114 are grouped in domains. In some such examples, the domains of form types 114 are used in the identification of candidate form types 128 in layer 0 118 and/or other operations of the key mapping engine 110 without departing from the description. For instance, in an example, a domain of form types 114 is defined for 'tax forms' and within that domain, there are several defined form types 114, such as W-2 forms, 1040 forms, 1099 forms, or the like. Further, other possible domain examples include a domain of legal forms used by court systems or other government agencies, a domain of medical forms used by hospitals to collect information from patients, and/or a domain of forms used internally by a specific company.

Additionally, or alternatively, in some examples, two different form types 114 include standard keys 116 that are similar or the same but mean different things. For instance, in an example, a form type 114 associated with a person's information includes a standard key 116 for a Personal Identification Number in the form of 'PIN', while in another form type 114 associated with product information includes a standard key 116 for a Product Identification Number in the form of 'PIN'. In such examples, the key mapping engine 110 is configured to determine the most likely form type 114 of a form 102 based on the entire set of input keys 106 and to map an input key 106 to the most likely 'PIN' standard key 116 based on that determination. In some such examples, such determinations are made in layer 3 124 as described herein.

In some examples, the standard key metadata 112 includes metadata from a wide variety of different forms. In some such examples, the set of standard key metadata 112 that is used is generated, obtained, and/or selected by users that design and/or configure the key mapping engine 110. Thus, these users choose the form types 114 with which the key mapping engine 110 is compatible. Additionally, or alternatively, in other examples, some or all key metadata used by the key mapping engine 110 is provided by another entity, such as a customer that provides metadata associated with its own custom forms. In such cases, the custom key metadata provided by the customer is used instead of or in conjunction with the standard key metadata 112 as described herein to generate the input key-standard key mappings 140.

The layer 0 118 of the key mapping engine 110 includes hardware, firmware, and/or software configured to generate a set of candidate form types 128 using the key-value pairs 104 and the standard key metadata 112. In some examples, the layer 0 118 includes a form type model 126 that has been trained to analyze the input keys 106 of the key-value pairs 104 with respect to the standard keys 116 of the form types 114 to narrow down the of form types 114 that are considered by later stages of the key mapping engine 110. Further, in some such examples, the form type model 126 is configured and/or trained to generate classification scores for each form type 114 in the standard key metadata 112 with respect to the form 102 being analyzed, wherein a classification score is indicative of a likelihood that the form 102 is of the associated form type 114. The candidate form types 128 are selected based on the generated classification scores. For instance, the form types 114 associated classification scores above a defined threshold are selected as candidate form types 128. Such a threshold includes a classification score value threshold (e.g., form types 114 associated with score values that exceed 75 are chosen), a top quantity threshold (e.g., the form types 114 associated with the top three classification scores are chosen), and/or a percentage threshold (e.g., the form types 114 associated with the top 10% of classification scores are chosen).

As previously described, in some examples, the form types 114 include domain information. In some such examples, the domain information is used by the form type model 126 in determining the candidate form types 128. For instance, in an example, the form type model 126 is trained to generate classification scores based at least in part on the domains of form types 114 and any available domain-specific data with which those domains are associated.

Further, in some examples, data provided in association with the form 102 includes a form type identifier. In some such cases, the key mapping engine 110 is configured to use the form type 114 identified by the included form type identifier and the operations of the layer 0 118 are skipped over and the process proceeds immediately to the layer 1 120.

The layer 1 120 includes hardware, firmware, and/or software configured to narrow down the set of keys that will be ranked in layer 2 122 using narrowing rules 130. The narrowing rules 130 are applied to the input keys 106 of the form 102 and/or the standard keys 116 of the candidate form types 128 to obtain narrowed keys 132. In some examples, the narrowing rules 130 include character string modification rules that make changes to input keys 106 and then compare the changed keys to the standard keys 116 to determine if an exact match or very close match is present. If a match for a changed input key 106 is present in the standard keys 116, the changed input key 106 is removed from the set of narrowed keys 132, such that the size of the set of narrowed keys 132 is reduced. Additionally, or alternatively, in some examples, the set of narrowed keys 132 includes the narrowed subset of input keys 106 and a narrowed subset of standard keys 116, such that, when a match between a changed input key 106 and a standard key 116 is identified using the narrowing rules 130, both the changed input key 106 and the matched standard key 116 are removed from the set of narrowed keys 132.

In some such examples, narrowing rules 130 that modify character strings include rules that modify an input key 106 by removing punctuation from the end of the string, rules that modify an input key 106 by removing or altering the whitespace of the input key 106, rules that convert sets of words of an input key 106 to acronyms, or the like. These rules are applied to the character strings of input keys 106 and the compared to the standard keys 116 of the candidate form types 128 in most examples. However, in some other examples, narrowing rules 130 are applied to standard keys 116 for comparison to input keys 106 without departing from the description. In other examples, other types of morphological and/or semantic rules are used as narrowing rules 130 without departing from the description.

The layer 2 122 includes hardware, firmware, and/or software configured to generate ranking scores 136 using a key pair rank model 134. In some examples, the key pair rank model 134 is trained to take the narrowed keys 132, including a subset of input keys 106 of the form 102 and a subset of standard keys 116 from candidate form types 128, as input and to generate a ranking score 136 for each pair of an input key 106 and a standard key 116. For instance, in an example where the narrowed keys 132 include a set of ten input keys 106 and a set of 50 standard keys 116, 500 ranking scores 136 are generated by the key pair rank model 134.

A ranking score 136, or key pair ranking score, associated with an input key 106 and a standard key 116 is indicative of a likelihood that the input key 106 has the same meaning as the standard key 116. In some examples, the higher the ranking score 136, the more likely it is that the input key 106 has the same meaning as the standard key 116. Thus, after the generation of the ranking scores 136, the scores 136 associated with a single input key 106 can be compared and the most likely matching standard key 116 can be determined by selecting the standard key 116 associated with the highest ranking score 136 of the input key 106.

In some examples, the key pair rank model 134 is a Deep Neural Network (DNN) that has been trained using machine learning techniques to produce fine-grained ranking scores 136. The training of the key pair rank model 134 and the form type model 126 is described in greater detail below.

The layer 3 124 includes hardware, firmware, and/or software configured to generate input key-standard key mappings 140 using key mapping rules 138. In some examples, the key mapping rules 138 are applied to the ranking scores 136 from the layer 2 122. Further, in some examples, the key mapping rules 138 are applied to groups of ranking scores 136 to resolve ambiguities and/or determine a consistent form type 114 of the candidate form types 128 for the form 102. For instance, in an example where the highest ranking scores 136 for the input keys 106 of the form 102 are associated standard keys 116 from several different candidate form types 128, the key mapping rules 138 are configured to resolve this ambiguity and determine a most likely consistent form type 114 to apply to the input keys 106. In such an example where there are 10 input keys 106 being evaluated and seven of the 10 input keys 106 have highest scores 136 in association with standard keys 116 from a first candidate form type 128 and the other three of the 10 input keys 106 have highest scores 136 in association with standard keys 116 from a second candidate form type 128, applying the key mapping rules 138 resolves the ambiguity by selecting the first candidate form type 128 as the type of form 102 and forcing the three other input keys 106 to be mapped to the highest scored standard keys 116 of that form type 128. Thus, in such an example, the key mapping rules 138 are configured to resolve such ambiguities using a 'majority vote' rule.

In other examples, the key mapping rules 138 are configured to generate the input key-standard key mappings 140 in other ways without departing from the description. For instance, in some examples, the key mapping rules 138 are configured to resolve form type ambiguity by selecting the candidate form type 128 that is associated with the highest average scores 136 for the set of input keys 106 being evaluated. Such a key mapping rule 138 may be useful in situations where the highest scores 136 of input keys 106 are associated with standard keys 116 from a wide variety of candidate form types 128, such that a 'majority vote' rule is more difficult to evaluate accurately. Other types of key mapping rules 138 are used in other examples without departing from the description.

Figure 2:
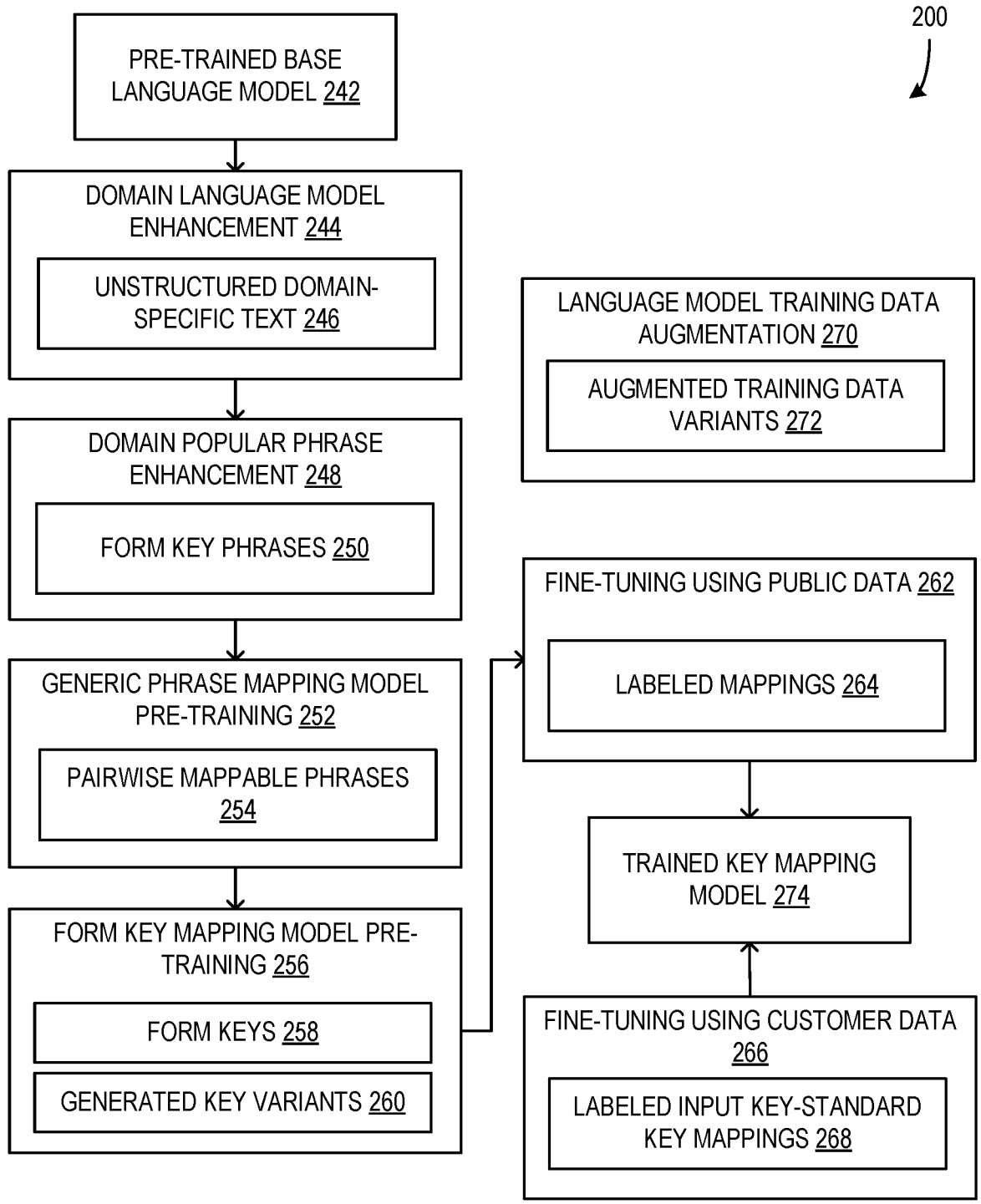
FIG. 2 is a block diagram illustrating a system configured for performing a training process of a trained key mapping model, such as a form type model and/or a key pair rank model.

FIG. 2 is a block diagram illustrating a system 200 configured for performing a training process of a trained key mapping model 274, such as a form type model 126 and/or a key pair rank model 134. A trained key mapping model 274 is a model that is trained to classify or otherwise determine a degree of similarity between a keys of different forms, generally. Such a trained key mapping model 274 can then be utilized to identify candidate form types 128 as a form type model 126. This is achieved by the form type model 126 determining standard keys 116 from form types 114 that are similar to the input keys 106 of a form 102 being analyzed and then identifying the form types 114 that are most similar to the form 102 based on those identified key relationships. Alternatively, or additionally, in some examples, a trained key mapping model 274 is utilized as a key pair rank model 134 to generate ranking scores 136 associated with pairs of keys that include an input key 106 paired with a standard key 116. In some examples, the system 200 trains the key pair rank model 134 of a system 100 prior to the system 100 being used to generate input key-standard key mappings 140 as described herein. Further, in some examples, the system 200 trains and/or fine-tunes the key pair rank model 134 using at least a portion of the described training process in parallel with the operations of the system 100 (e.g., the form key mapping model fine-tuning using customer data 266).

The system 200 includes a pre-trained base language model 242 that forms the basis for the resulting trained key mapping model 274. In some examples, the pre-trained base language model 242 is a state-of-the-art generic model such as Bidirectional Encoder Representations from Transformers (BERT), Z-Code, or third generation Generative Pre-trained Transformer (GPT-3) models.

The system 200 uses domain language model enhancement 244 processes on the model 242 to begin the training process. Unstructured domain-specific text 246 is used as training data to enhance the trained model 274 with respect to the form domains for which the model 274 is being configured. In some examples, algorithms and/or tools are used to collect the unstructured domain-specific text 246 from the Internet and/or other sources, such that a massive quantity of training data is obtained and used to train the model 274. For instance, in an example where the domain of the forms is a medical domain, unstructured text associated with medical settings is used as training data with the pre-trained base language model 242 to enhance the resulting trained model 274 with respect to medical text as described herein.

The system 200 then uses domain popular phrase enhancement 248 processes to train the model 274. In some examples, for each form domain, algorithms and/or tools are used to collect popular phrases used in those form domains. In particular, form key phrases 250 that are likely to be used as keys for forms in those domains are identified and collected. In some such examples, the form key phrases 250 are collected from domain-specific web pages, images, and/or documents that are found on the Internet and/or other similar sources. Further, the form key phrases 250 include usage context data associated with the source page/document in which the phrases are found. In some such examples, the model being trained is trained as a phrase embedding model that is enhanced or otherwise tuned based on using the form key phrases 250 as training data. The resulting model is trained for enhanced understanding of popular phrases for each form domain. It should be understood that the domain popular phrase enhancement 248 differs from the domain language model enhancement 244 at least in that the domain-specific text 246 used in the enhancement 244 is unstructured and/or lacking associated context data, while the form key phrases 250 used in the enhancement 250 are structured as popular phrases that occur on domain-specific forms and/or they include context data such as source page and/or source document data.

It should be understood that, in some examples, domain-specific text training data (e.g., data used in the method 300 of FIG. 3, described below) includes unstructured domain-specific text 246 and/or form key phrases 250 that are associated with the domain.

The system 200 then uses generic phrase mapping model pre-training 252 processes to train the model 274. In some examples, previous steps have not included any supervised formatting of key mapping training data (e.g., labeling whether two candidate keys are semantically identical or sufficiently similar). The pre-training 252 uses paired key data in the form of mined pairwise mappable phrases 254 to improve the model with respect to mapping key phrases to each other. In some such examples, many or all possible pairwise labeling data is collected from open-source phrase paraphrase datasets or the like to obtain the pairwise mappable phrases 254. Further, in some examples, the phrases 254 are collected from related web pages such as pages that provide synonyms, linguistic dictionary web pages, web pages that provide names and aliases for entities, or the like. In some such examples, the data is not specifically related to form documents, but the pairwise phrase similarity labeled data is helpful to train the generic model capability of judging whether two keys are semantically the same or similar.

The system 200 then uses form key mapping model pre-training 256 processes to train the model 274. In some examples, the pre-training 256 processes collect public, customer-specific, or other entity-specific form documents from various sources, such as the Internet and the model is trained using key data from these form documents as training data. Further, in some examples, a FR application is applied to the form documents to extract form document keys 258 and, in some cases, the keys 258 are used with a paraphrasing generation algorithm (e.g., using GPT-3 and/or other language models) to automatically generate variants 260 of each form document key 258. In some such examples, a variant 260 of a key 258 is a word or phrase that is considered to be semantically the same as or similar to the key 258. The generated variants 260 and the extracted form document keys 258 are used as paired key data to pre-train the model to recognize variants 260 of keys 258 that are semantically the same as the keys 258.

Additionally, it should be understood that the pre-training 256 processes and other processes performed by the system 200 are configured to account for and/or follow any established compliance rules and/or privacy constraints with respect to data gathered for use in training the model as described herein.

Further, it should be understood that, in some examples, paired key data includes data entries in which a first data value is paired with a second data value, representing that the first data value and second data value are semantically similar or the same. In some such examples, the values are words, phrases, or other text.

The system 200 then uses form key mapping model fine-tuning 262 processes using public data to fine-tune the model 274. In some examples, the fine-tuning 262 includes using labeled mappings 264 as training data, wherein the labeled mappings 264 are generated manually by human users to at least some extent. For instance, in some examples, the labeled mappings include labeled input key-standard key mappings, which are input keys that have been paired with standard keys manually, indicating that the input key of the pair maps to the standard key of the pair based on the meaning of both keys of the pair. In some such examples, the generation of the labeled mappings 264 includes selecting a small quantity of form documents from the previous pre-training 256 or other stages of the process and providing those selected form documents to a crowd-based labeling platform, such as a Universal Human Relevance System (UHRS). In a crowd-based labeling platform such as UHRS, users of the platform manually create labels that identify mappings between keys of the form documents and standard keys for which the model is being trained. This fine-tuning 262 improves the performance of the model on the form types of the selected form documents.

Further, the system 200 uses form key mapping model fine-tuning 266 processes using customer data. In some examples, this fine-tuning 266 is performed after the trained model has been used by a customer in a runtime system such as system 100. In such examples, input key-standard key mappings 140 that have been generated by the runtime system are used as labeled input key-standard key mapping 268 training data to further improve the next version of the model 274. Additionally, in some examples, user feedback from the customer is also collected and used during the fine-tuning 266 to determine the content of the mappings that are used as training data.

Additionally, or alternatively, throughout the processes performed by the system 100, in some examples, the system 100 is configured to use language model training data augmentation 270 to generate augmented training data variants 272. In situations where any of the process stages lack sufficient variants to form a useful training data set, a language model (e.g., the GPT-3 model) is used to generate variants of existing training data, thereby expanding the quantity of data in the training data sets.

Further, in some examples, the key mapping model 274 is trained to generate ranking scores of input key-standard key pairs as a key pair rank model 134 in a system such as system 100. Further, in some such examples, the key mapping model 274 is used to generate the form type model 126 that is used in systems such as system 100. In such examples, the key mapping model 274 is used to obtain vector representations for multiple keys (key vectors) from the form 102. A key vector of a key is a set of numerical values that is generated using the key and an encoding process. The result of the encoding process is a key vector with numerical values that are based on details of the key (e.g., which characters are included in the key and in which order) and the combination of which is effectively unique to that particular key, meaning that the precise key vector generated from a key will never be generated using a different key. Such encoding processes are often configured to provide key vectors that are indicative of similarities of the keys from which they are generated, such that key vectors of two keys with similar characters and/or structures have more similar sets of numerical values than key vectors of two keys with very different characters and/or structures.

The key vectors are aggregated into a single aggregate vector that is representative of the form 102. Aggregate vectors are sets of numerical values, similar to the key vectors, and are generated using averaging of values of multiple key vectors, applying weights to different vectors, and/or other aggregation techniques. The aggregate vector is compared to aggregate vectors of form types 114 to determine the candidate form types 128, wherein the candidate form types 128 are selected for having aggregate vectors that are most similar to the aggregate vector of the form 102.

It should be understood that, in other examples, more, fewer, or different processes are used in the same or different order of operations to train a key mapping model 274 without departing from the description.

Figure 3:
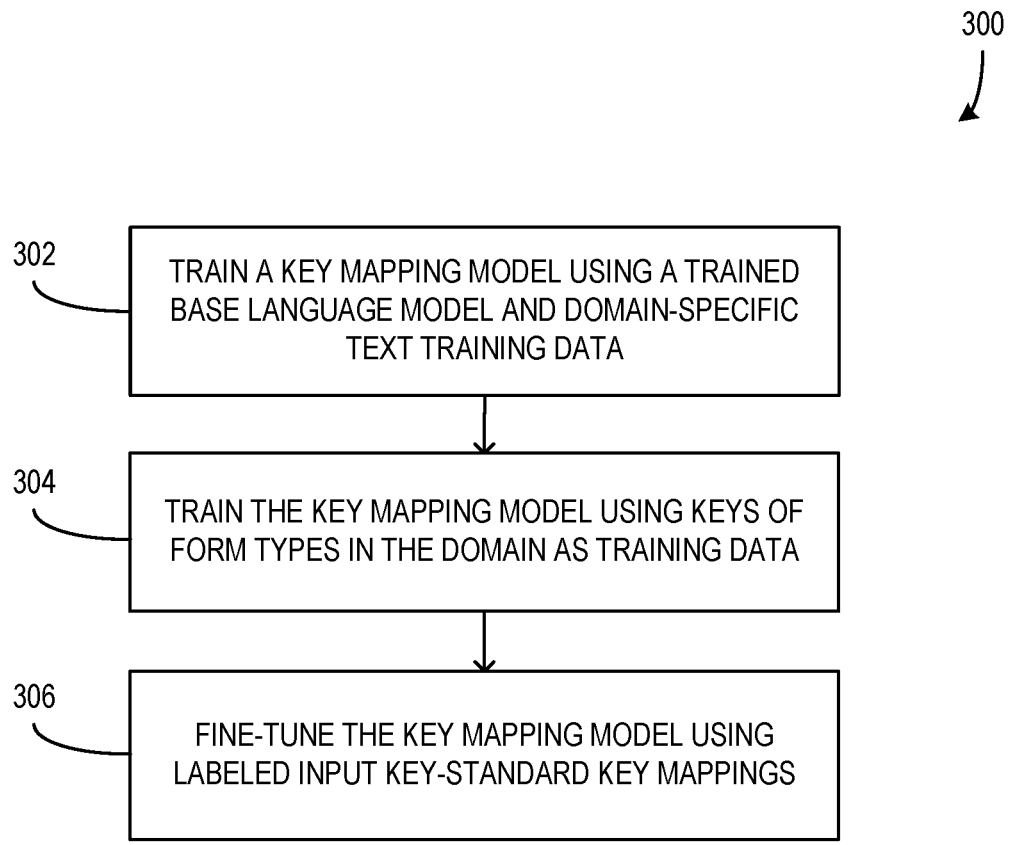
FIG. 3 is a flowchart illustrating a computerized method for training a key mapping model.

FIG. 3 is a flowchart illustrating a computerized method 300 for training a key mapping model. In some examples, the method 300 is executed or otherwise performed in a system such as system 200 of FIG. 2.

At 302, the key mapping model (e.g., the key mapping model 274) is initially trained using a trained base language model and domain-specific text training data. In some examples, the trained base language model is a GPT-3 model or the like. Further, in some such examples, training the key mapping model using domain-specific text training data includes domain language model enhancement 244 and/or domain popular phrase enhancement 248 and the domain-specific text training data includes unstructured domain-specific text 246 and/or form key phrases 250 as described herein. Through the training at 302, the key mapping model is trained to better recognize words, phrases, and/or text associated with the domain for which it is being trained, where the domain of form types includes a set of different form types that are related to a shared purpose, setting, or the like (e.g., a tax form domain, a legal form domain, a medical form domain, or a domain that is specific to a particular company).

At 304, the key mapping model is trained using paired key data of form types (e.g., form types 114) in the domain as training data. In some examples, training the key mapping model using paired key data of form types includes form key mapping model pre-training 256. Additionally, or alternatively, the key mapping model is trained using generic phrase mapping model pre-training 252 as described herein. In some such examples, the paired key data includes pairwise mappable phrases 254 and/or form keys 258 paired with generated key variants 260. Through the training at 304, the key mapping model is trained to better determine words, phrases, and/or text that are semantically the same as or similar to each other, including the phrases or other text that are used as pairwise mappable phrases 254 during generic phrase mapping model pre-training 252 and/or form keys 258 of forms during form key mapping model pre-training 256.

It should be understood that the training at 302 is used to improve the key mapping model's capability to determine semantic meaning of words and phrases, while the training at 304 uses paired training data (e.g., pairwise mappable phrases 254 which include pairs of phrases that are considered synonymous and/or form keys 258 paired with generated key variants 260) to improve the key mapping model's capability to accurately map words and phrases to other semantically identical or similar words and phrases.

At 306, the key mapping model is fine-tuned using labeled input key-standard key mappings. In some examples, fine-tuning the key mapping model using labeled input key-standard key mappings includes fine-tuning using public data 262 and/or fine-tuning using customer data 266, wherein the training data includes labeled input key-standard key mappings 264 and/or labeled input key-standard key mappings 268, as described herein. In some such examples, the fine-tuning using public data 262 is performed before the key mapping model 274 is released to a customer entity and the fine-tuning using customer data 266 is performed after the customer entity has started using the model 274, as described herein. It should be understood that, in some examples, the fine-tuning at 306 uses labeled training data that is manually generated in some manner (e.g., people manually assign custom keys to standard keys that are defined). This training data is high quality but the quantity of manually labeled data is small in comparison to other sets of training data because of the relatively high cost of the manual data labeling tasks. The fine-tuning at 306 differs from the training at 302 and 304 at least because the training at 302 and 304 does not use manually labeled training data.

Additionally, in some examples, the customer entity that participates in the training of the trained key mapping model 274 as described herein includes a company, organization, person, or other entity that owns, uses, or otherwise interacts with forms that have keys as described herein. Further, in some examples, the customer entity includes one or more computing devices associated with a customer that are configured to communicate with computing devices of the systems 100 and/or 200 as described herein. For instance, in an example, a customer entity includes a company that owns several computing devices which are configured to store form data specific to that customer entity's forms and to communicate with the system 200 to participate in the training of the trained key mapping model 274 as described herein.

Further, in some examples, the training of the key mapping model using method 300 includes generating training data variants using a language model (e.g., GPT-3 model) as described above with respect to language model training data augmentation 270 of FIG. 2. In some such examples, a variant 272 of a training data value or entry is a training data value or entry that is considered to be semantically similar to the existing training data value or entry. Additionally, or alternatively, the generated augmented training data variants 270 are used to expand training data sets at one or more stages of the key mapping training process as described herein with respect to FIGS. 2 and 3.

Additionally, or alternatively, in some examples, the use of labeled training data includes providing a set of form documents to a crowd-based labeling platform and then receiving the labeled input key-standard key mappings from the crowd-based labeling platform in response, wherein the received mappings are associated with the provided set of form documents. In a crowd-based labeling platform such as UHRS, users of the platform manually create labels that identify mappings between keys of the form documents and standard keys for which the model is being trained. The received labeled input key-standard key mappings are used to fine-tune the key mapping model as described herein.

Figure 4:
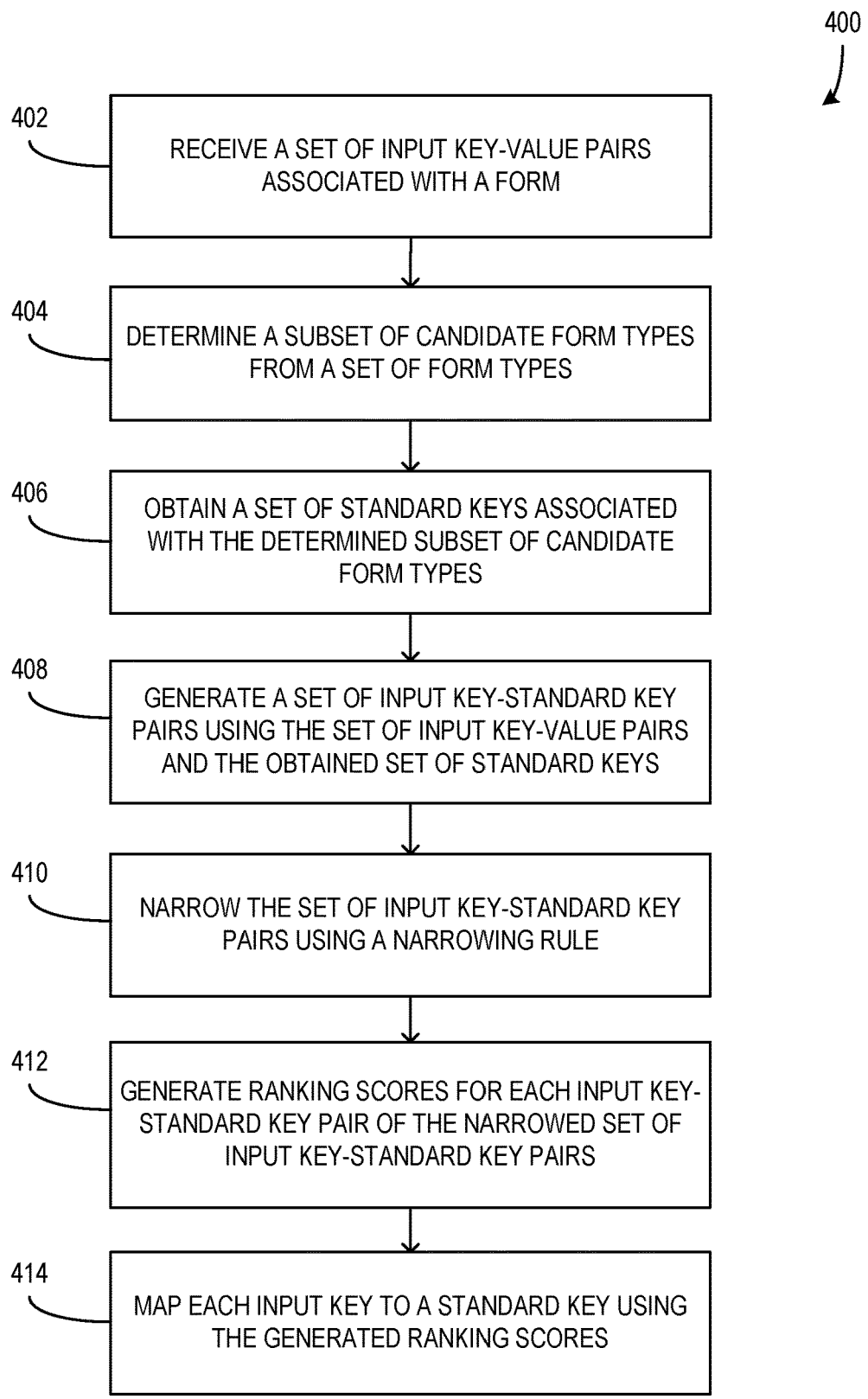
FIG. 4 is a flowchart illustrating a computerized method for generating input key-standard key mappings using a set of input key-value pairs from a form.

FIG. 4 is a flowchart illustrating a computerized method 400 for generating input key-standard key mappings (e.g., mappings 140) using a set of input key-value pairs (e.g., input key-value pairs 104) from a form (e.g., form 102). In some examples, the method 400 is executed or otherwise performed by a system such as system 100 of FIG. 1.

At 402, a set of input key-value pairs (e.g., key-value pairs 104) associated with a form (e.g., form 102) is received. In some examples, the set of input key-value pairs are received from an FR application or service. Further, in some examples, form type information is received with the input key-value pairs and, in such cases, the steps to determine candidate form types are skipped as described herein.

At 404, a subset of candidate form types (e.g., candidate form types 128) is determined from a set of form types (e.g., form types 114). In some examples, a form type model (e.g., form type model 126) is used with the received input key-value pairs to determine the subset of candidate form types, wherein the form type model has been trained using machine learning techniques. For instance, in an example, the form type model is used to generate vectors for each key of the input keys and the generated vectors are combined into an aggregate vector of the form. The aggregate vector of the form is compared to aggregate vectors of the standard form types (e.g., form types 114) and the form types with the most similar aggregate vectors to the aggregate vector of the form are selected as candidate form types.

At 406, a set of standard keys associated with the determined subset of candidate form types is obtained and, at 408, a set of input key-standard key pairs is generated using the set of input key-value pairs and the obtained set of standard keys. In some examples, the obtained set of standard keys includes all standard keys from each of the candidate form types and/or the resulting set of input key-standard key pairs is a set of pairs that includes each input key paired with each standard key.

At 410, the set of input key-standard key pairs is narrowed using a narrowing rule. In some examples, multiple narrowing rules are used to narrow the quantity of key pairs. Further, in some examples, the narrowing rule(s) include a rule that removes punctuation from an input key, a rule that changes whitespace in an input key, and/or a rule that removes whitespace from an input key. In other examples, other narrowing rules are used without departing from the description. The modified keys from the application of narrowing rules are compared to the standard keys and, if a match is identified, the key that had been modified is removed from the set of input key-standard key pairs, including all pairs that include the removed input key. Additionally, or alternatively, narrowing rules that are applied to standard keys are also used to narrow the set of key pairs without departing from the description.

At 412, ranking scores (e.g., ranking scores 136) are generated for each input key-standard key pair in the narrowed set of key pairs, wherein. In some examples, the ranking scores are generated by a trained model (e.g., a key pair rank model 134). Further, in some such examples, the generated ranking scores are indicative of a likelihood that the input key and standard key of the associated pair are semantically similar or the same, such that higher ranking scores indicate that the keys are more likely to match semantically.

At 414, each input key is mapped to a standard key using the generated ranking scores, resulting in input key-standard key mappings 140. In some examples, key mapping rules 138 are used to determine the mappings. In some such examples, the key mapping rules 138 are used to determine a most likely form type from the candidate form types 128 based on the ranking scores 136 as described above with respect to FIG. 1.

For instance, in an example, standard keys that are associated with the highest ranking scores for each input key are identified. A subset of form types of the set of candidate form types is determined using the identified standard keys and a form type of the determined subset of form types is selected using the identified standard keys. In some examples, the selection is based on the selected form type being associated with the largest quantity of identified standard keys. The input keys are then mapped to standard keys of the selected form type for which the associated ranking scores are of the highest value. For example, after the form type is selected, for each input key, the subset of standard keys associated with the selected form type is determined and the standard key of that subset that has the highest ranking score in association with the input key is mapped to that input key.

Further, in some examples, the set of form types includes at least one of the following: a standard set of form types and a customer-specific set of form types, wherein the form with which the received set of input key-value pairs is associated is associated with a customer of the customer-specific set of form types.

ADDITIONAL EXAMPLES

Figure 5:
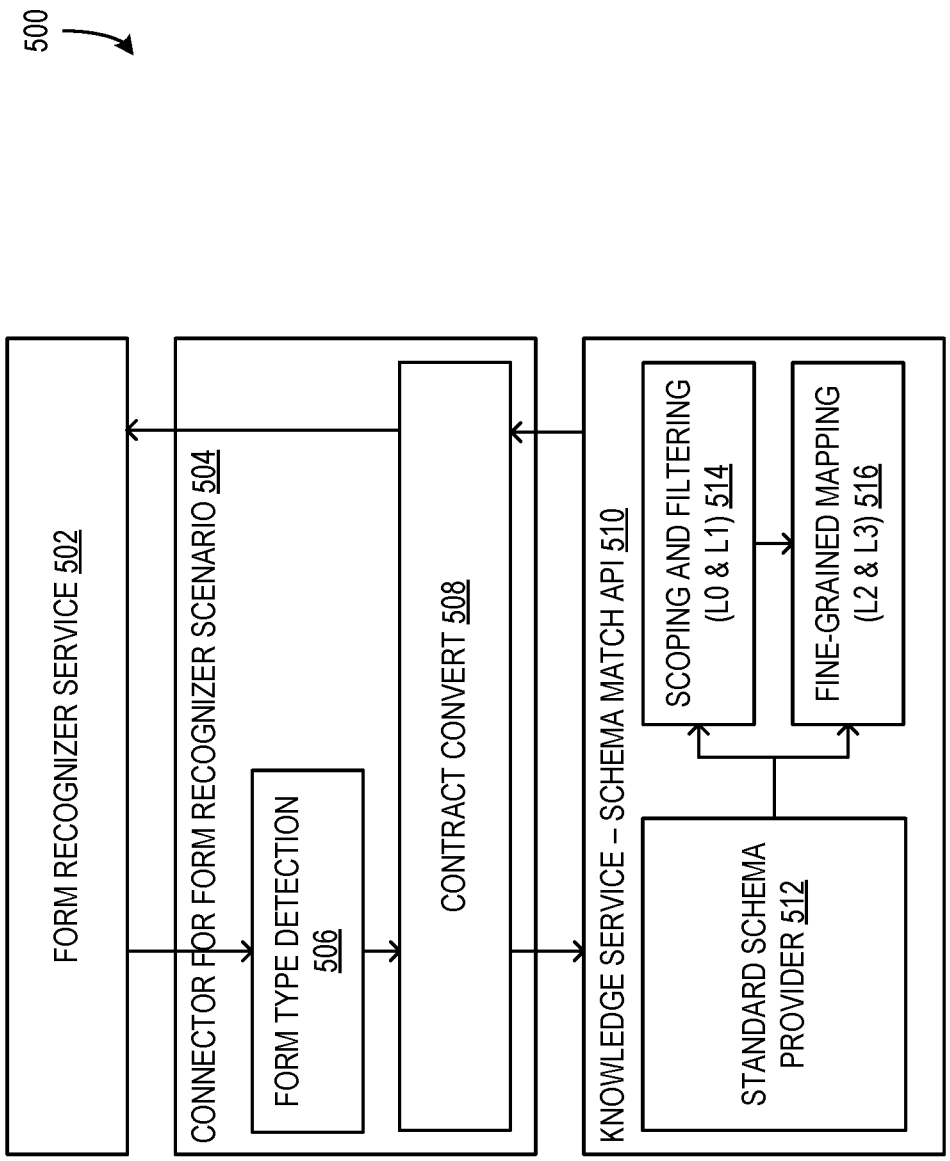
FIG. 5 is a block diagram illustrating a system configured to provide mapped key data to a FR Service by a key mapping engine of a Knowledge Service.

FIG. 5 is a block diagram illustrating a system 500 configured to provide mapped key data to a FR Service 502 by a key mapping engine of a Knowledge Service in some examples. The system 500 includes a FR Service 502 (e.g., an FR application as described herein) that provides input key-value pairs of a form to a Connector for Form Recognizer Scenario 504. In some such examples, form type detection 506 is performed in the Connector 504 and a Contract Convert module 508 sends the form data to the Knowledge Service—Schema Match API 510 (e.g., the key mapping engine 110 of system 100). The Schema Mapping API 510 uses the provided form data and standard schema data from a Standard Schema Provider 512 (e.g., the standard key metadata 112 of key mapping engine 110) to perform a multi-layer key mapping process as described herein. The process includes Scoping and Filtering (L0 & L1) 514 (e.g., the Layer 0 118 and Layer 1 120 processes of the key mapping engine 110) and Fine-Grained Mapping (L2 & L3) 516 (e.g., the Layer 2 122 and Layer 3 124 of the key mapping engine 110) processes.

Figure 6:
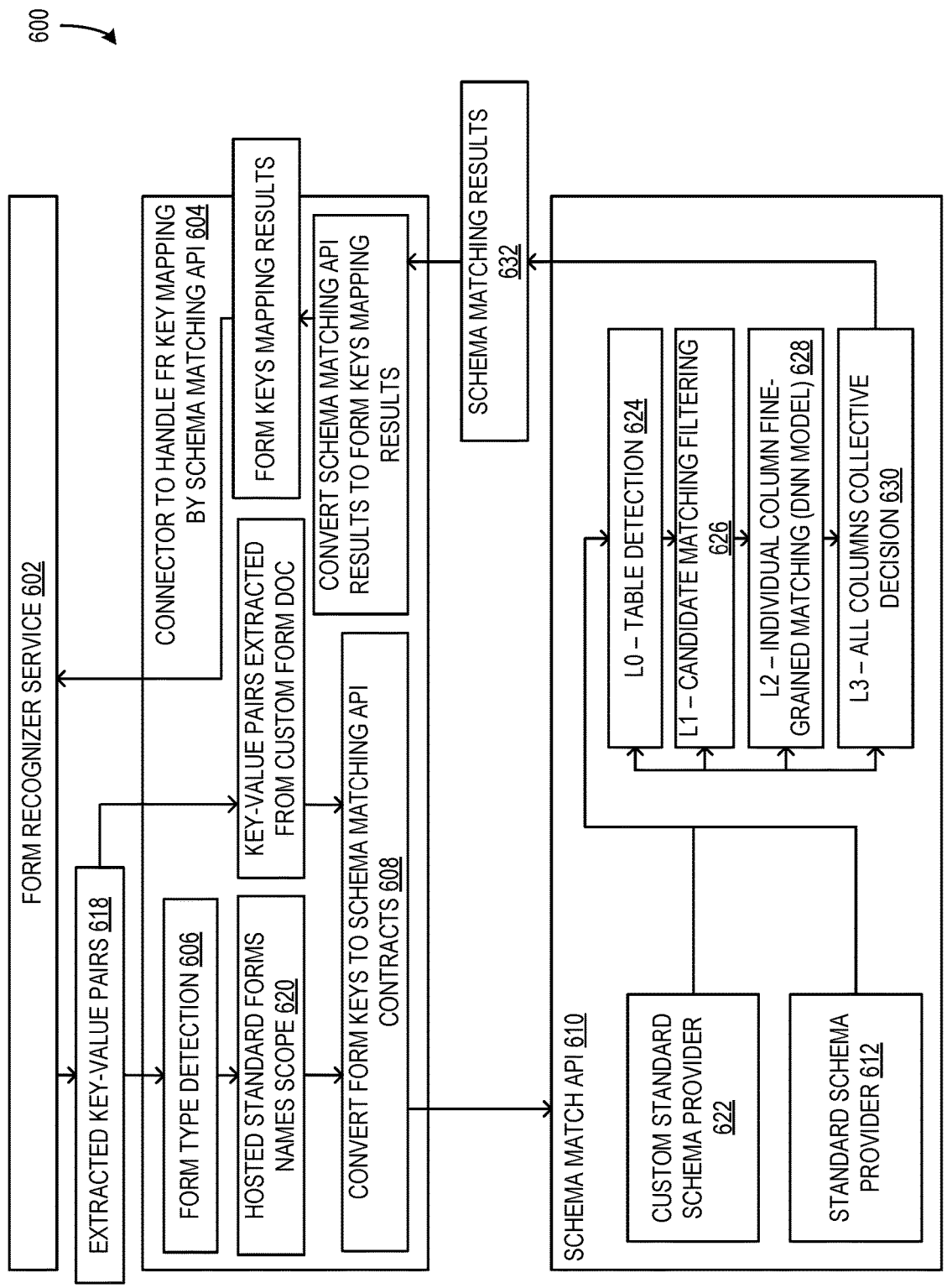
FIG. 6 is a block diagram illustrating a system that is a more detailed version of the system of FIG. 5.

FIG. 6 is a block diagram illustrating a system 600 that is a more detailed version of the system 500 of FIG. 5. In some examples, the FR service 602 analyzes a custom form document (e.g., a bank statement form) and extracts key-value pairs 618, such as a person's Social Security Number (SSN) and an associated key 'SSN' as displayed on the form. The extracted key-value pairs 618 are provided to the connector of the Schema Mapping API 604 (e.g., the key mapping engine 110). In the connector 604, the key-value pairs 618 are converted to "Schema Matching API contracts" at 608, which are data structures that are compatible with the Schema Matching API 610. Additionally, or alternatively, the Form Type Detection module 606 of the connector 604 identifies one or more candidate form types of the custom form doc based on the extracted key-value pairs at 620.

In some examples, Custom Standard Form Schema (e.g., key metadata provided by a customer) is provided to the Schema Matching API 610 via the connector 604. The Custom Standard Form Schema is used instead of or in addition to the Hosted Schema Metadata (e.g., the standard key metadata 112).

Further, in some examples, the Custom Standard Schema Metadata Provider 622 and/or the Hosted Standard Schema Metadata Provider 612 provide key metadata to the multi-layered process of key mapping generation (e.g., layers 118-124). The provided metadata includes custom columns and/or context/options associated therewith. The L0 Table Detection layer 624 (e.g., layer 0 118) detects candidate form types 128 from the Schema Metadata, L1 Candidate Matching Filtering 626 (e.g., layer 1 120) narrows the set of input keys and/or standard keys into top possible <custom column, standard column> pairs (e.g., a set of narrowed keys 132), L2 Individual Column Fine-grained Matching 628 (DNN Model via OnnxRuntime) (e.g., layer 2 122) generates ranking scores 136 to perform fine-grained matching for individual columns, and L3 All Columns Collective Decision 630 (e.g., layer 3 124) decides collectively on the input key-standard key mappings 140 considering all columns for consistence. The Schema Matching Results 632 (e.g., input key-standard key mappings 140) are provided back to the FR service via the connector as illustrated.

Figure 7:
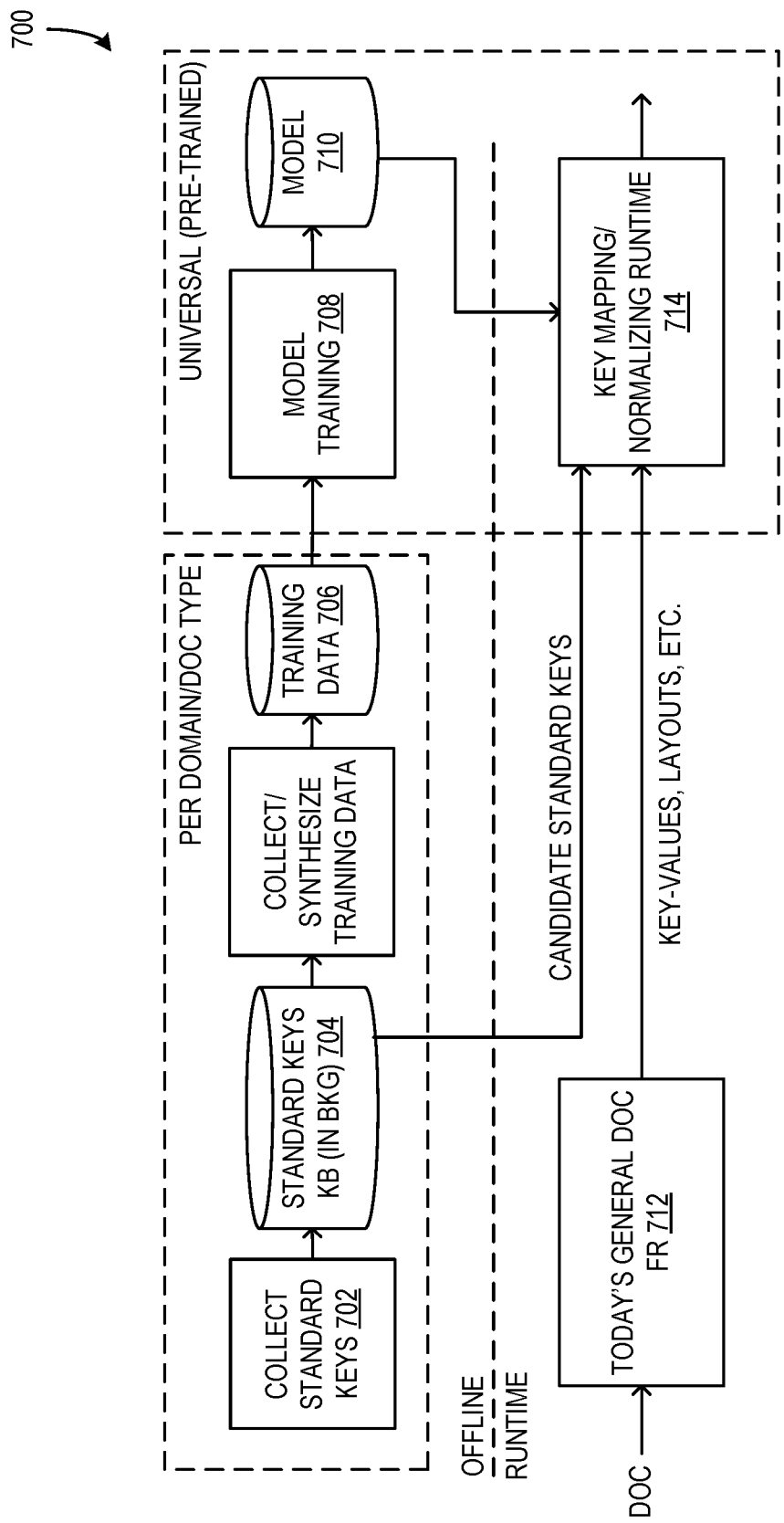
FIG. 7 is a block diagram illustrating the offline and runtime operations of the disclosure.

FIG. 7 is a block diagram 700 illustrating the offline and runtime operations of the disclosure. In some examples, the offline operations include the collection of standard keys 702 for use as Candidate Standard Keys 704 (e.g., standard keys 116) and for use as training data 706 during the model training. Further, the model training process 708, as described herein at least with respect to FIG. 2, is performed offline to generate the key pair rank model 134 and/or form type model 126 (model 710) used during runtime. The runtime operations include the extraction of key-value pairs from a form or document by an FR application 712 or service and the analysis of those key-value pairs to generate the document keys annotated with standard keys at 714 (e.g., the input key-standard key mappings 140).

Figure 8:
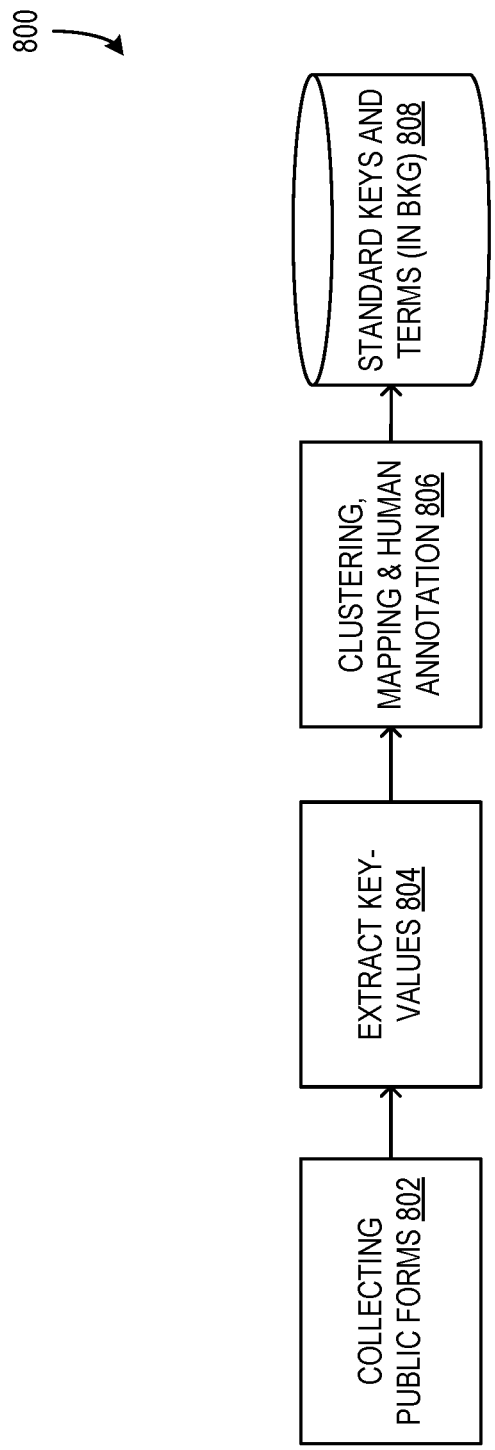
FIG. 8 is a block diagram illustrating a process configured to obtain standard keys and terms from public forms for use in the disclosure.

FIG. 8 is a block diagram illustrating a process 800 configured to obtain standard keys and terms from public forms for use in the disclosure. In some examples, the process 800 includes collecting public forms 802 and extracting key-value pairs 804 from the collected public forms. The key-value pairs are extracted using FR applications or services. The extracted key-value pairs are analyzed using clustering, mapping, and/or human annotation techniques 806 that provide an accurate set of standard keys and terms 808 that can be used by the described systems and methods for mapping input keys thereto.

Figure 9:
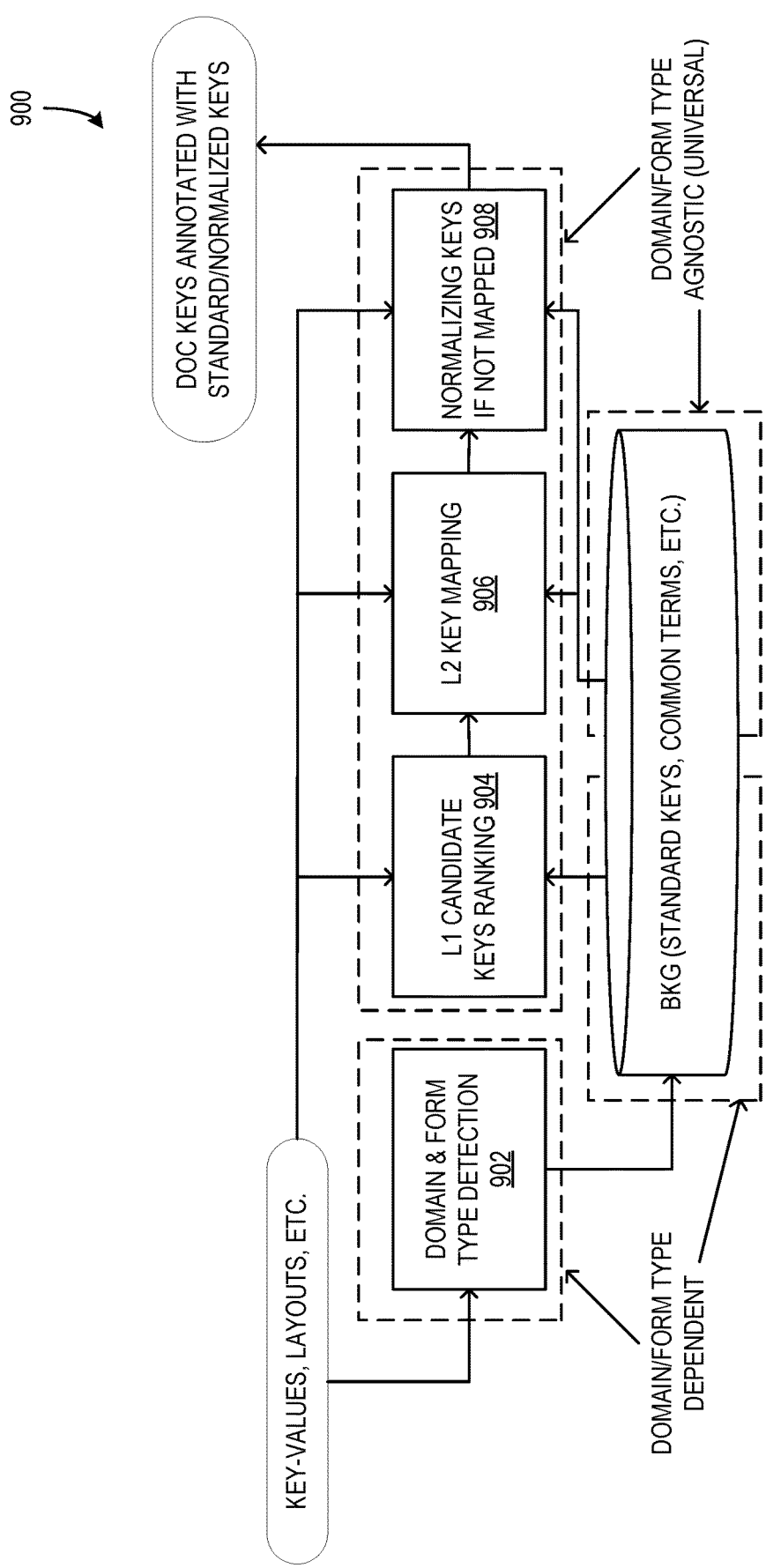
FIG. 9 is a block diagram illustrating the portions of the disclosed process that are domain/form type dependent and portions of the disclosed process that are domain/form type agnostic or universal.

FIG. 9 is a block diagram 900 illustrating the portions of the disclosed process that are domain/form type dependent and portions of the disclosed process that are domain/form type agnostic or universal. In some examples, the domain and form type detection processes 902 (e.g., layer 0 118) are domain/form type dependent. Further, some of the standard key metadata 112 is also domain/form type dependent. Alternatively, the L1 Candidate Key Ranking 904, L2 Key Mapping 906, and Normalization of Keys if not mapped 908 are performed in a domain/form type agnostic manner, such that these stages do not require any sort of domain-specific training of models or the like.

Exemplary Operating Environment

The present disclosure is operable with a computing apparatus according to an embodiment as a functional block diagram 1000 in FIG. 10. In an example, components of a computing apparatus 1018 are implemented as a part of an electronic device according to one or more embodiments described in this specification. The computing apparatus 1018 comprises one or more processors 1019 which may be microprocessors, controllers, or any other suitable type of processors for processing computer executable instructions to control the operation of the electronic device. Alternatively, or in addition, the processor 1019 is any technology capable of executing logic or instructions, such as a hard-coded machine. In some examples, platform software comprising an operating system 1020 or any other suitable platform software is provided on the apparatus 1018 to enable application software 1021 to be executed on the device.

In some examples, computer executable instructions are provided using any computer-readable media that are accessible by the computing apparatus 1018. Computer-readable media include, for example, computer storage media such as a memory 1022 and communications media. Computer storage media, such as a memory 1022, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 1022) is shown within the computing apparatus 1018, it will be appreciated by a person skilled in the art, that, in some examples, the storage is distributed or located remotely and accessed via a network or other communication link (e.g., using a communication interface 1023).

Further, in some examples, the computing apparatus 1018 comprises an input/output controller 1024 configured to output information to one or more output devices 1025, for example a display or a speaker, which are separate from or integral to the electronic device. Additionally, or alternatively, the input/output controller 1024 is configured to receive and process an input from one or more input devices 1026, for example, a keyboard, a microphone, or a touchpad. In one example, the output device 1025 also acts as the input device. An example of such a device is a touch sensitive display. The input/output controller 1024 may also output data to devices other than the output device, e.g., a locally connected printing device. In some examples, a user provides input to the input device(s) 1026 and/or receive output from the output device(s) 1025.

The functionality described herein can be performed, at least in part, by one or more hardware logic components. According to an embodiment, the computing apparatus 1018 is configured by the program code when executed by the processor 1019 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system comprises: a processor; and a memory comprising computer program code, the memory and the computer program code configured to, with the processor, cause the processor to: train a key mapping model using a trained base language model and domain-specific text training data, wherein the domain-specific text training data is specific to a domain of form types; train the key mapping model using paired key data of form types in the domain as training data; and fine-tune the key mapping model using labeled mappings.

An example computerized method comprises: receiving a set of input key-value pairs associated with a form; determining a subset of candidate form types from a set of form types using the set of input key-value pairs; obtaining a set of standard keys associated with the determined subset of candidate form types; generating a set of input key-standard key pairs using the set of input key-value pairs and the obtained set of standard keys; narrowing the set of input key-standard key pairs using a narrowing rule; generating ranking scores for each input key-standard key pair of the narrowed set of input key-standard key pairs using a trained model; and mapping each input key of the set of input key-value pairs to a standard key of the set of standard keys using at least the generated ranking scores of the narrowed set of input key-standard key pairs.

One or more computer storage media having computer-executable instructions that, upon execution by a processor, cause the processor to at least: receive a set of input key-value pairs associated with a form; determine a subset of candidate form types from a set of form types using the set of input key-value pairs; obtain a set of standard keys associated with the determined subset of candidate form types; generate a set of input key-standard key pairs using the set of input key-value pairs and the obtained set of standard keys; narrow the set of input key-standard key pairs using a narrowing rule; generate ranking scores for each input key-standard key pair of the narrowed set of input key-standard key pairs using a trained model; and map each input key of the set of input key-value pairs to a standard key of the set of standard keys using at least the generated ranking scores of the narrowed set of input key-standard key pairs.

Alternatively, or in addition to the other examples described herein, examples include any combination of the following:

wherein determining the subset of candidate form types from the set of form types using the set of input key-value pairs includes: generating, using a trained form type model, key vectors of input keys of the set of input key-value pairs; aggregating the generated key vectors into an aggregate vector of the form; comparing the aggregate vector of the form to aggregate vectors of the set of form types; and selecting the subset of candidate form types from the set of form types based on the comparing of the aggregate vector of the form to the aggregate vectors of the set of form types.

wherein narrowing the set of input key-standard key pairs using a narrowing rule includes: modifying an input key of the set of input key-standard key pairs using the narrowing rule; identifying a standard key of the set of input key-standard key pairs that matches the modified input key; and removing a subset of input key-standard key pairs that include the input key modified by the narrowing rule from the set of input key-standard key pairs based on identifying the standard key that matches the modified input key.

wherein modifying the input key using the narrowing rule includes at least one of the following: removing punctuation from the input key, changing whitespace in the input key, and removing whitespace from the input key.

wherein the set of form types includes at least one of the following: a standard set of form types and a customer-specific set of form types, wherein the form with which the received set of input key-value pairs is associated is associated with a customer of the customer-specific set of form types.

wherein mapping each input key of the set of input key-value pairs to a standard key of the set of standard keys using at least the generated ranking scores of the narrowed set of input key-standard key pairs further includes: identifying standard keys of the narrowed set of input key-standard key pairs associated with highest ranking scores for each input key of the narrowed set of input key-standard key pairs; determining a subset of form types associated with the identified standard keys; selecting a form type of the determined subset of form types using the identified standard keys; and mapping the input keys to standard keys of the selected form type for which the associated ranking scores are the highest values.

wherein selecting the form type of the determined subset of form types using the identified standard keys includes selecting the form type with which a largest quantity of identified standard keys are associated.

wherein the memory and the computer program code are configured to, with the processor, further cause the processor to: generate training data variants from the keys of form types using a language model, wherein training the key mapping model using the keys of form types as training data includes using the generated training data variants as training data.

wherein fine-tuning the key mapping model using labeled input-key standard key mappings includes: providing a set of form documents to a crowd-based labeling platform; and receiving the labeled mappings from the crowd-based labeling platform, wherein the labeled mappings are associated with the provided set of form documents.

wherein the memory and the computer program code are configured to, with the processor, further cause the processor to: provide the fine-tuned key mapping model to a customer entity; receive feedback data from the customer entity associated with use of the provided fine-tuned key mapping model for generating ranking scores, wherein the feedback data includes at least one of input key-standard key mappings generated by the fine-tuned key mapping model using data of the customer entity and user feedback data from users at the customer entity; and fine-tune the key mapping model using the received feedback data as training data.

wherein the fine-tuned key mapping model is trained to generate ranking scores of input key-standard key pairs that are indicative of a likelihood that an input key and a standard key of an associated pair are semantically similar.

wherein the fine-tuned key mapping model is trained to: generate key vectors of keys of a form; and aggregate the generated key vectors into an aggregate vector of the form, whereby the aggregate vector of the form is used to determine a candidate form type of the form.

Any range or device value given herein may be extended or altered without losing the effect sought, as will be apparent to the skilled person.

Examples have been described with reference to data monitored and/or collected from the users (e.g., user identity data with respect to profiles). In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for receiving a set of input key-value pairs associated with a form; exemplary means for determining a subset of candidate form types from a set of form types using the set of input key-value pairs; exemplary means for obtaining a set of standard keys associated with the determined subset of candidate form types; exemplary means for generating a set of input key-standard key pairs using the set of input key-value pairs and the obtained set of standard keys; exemplary means for narrowing the set of input key-standard key pairs using a narrowing rule; exemplary means for generating ranking scores for each input key-standard key pair of the narrowed set of input key-standard key pairs using a trained model; and exemplary means for mapping each input key of the set of input key-value pairs to a standard key of the set of standard keys using at least the generated ranking scores of the narrowed set of input key-standard key pairs.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computerized method comprising:
   receiving a set of input key-value pairs associated with a form;
   determining a subset of candidate form types from a set of form types using the set of input key-value pairs;
   obtaining a set of standard keys associated with the determined subset of candidate form types;
   generating a set of input key-standard key pairs using the set of input key-value pairs and the obtained set of standard keys;
   narrowing the set of input key-standard key pairs using a narrowing rule;
   generating ranking scores for each input key-standard key pair of the narrowed set of input key-standard key pairs using a trained model; and
   mapping each input key of the set of input key-value pairs to a standard key of the set of standard keys using at least the generated ranking scores of the narrowed set of input key-standard key pairs.

2. The computerized method of claim 1, wherein determining the subset of candidate form types from the set of form types using the set of input key-value pairs includes:
   generating, using a trained form type model, key vectors of input keys of the set of input key-value pairs;
   aggregating the generated key vectors into an aggregate vector of the form;
   comparing the aggregate vector of the form to aggregate vectors of the set of form types; and
   selecting the subset of candidate form types from the set of form types based on the comparing of the aggregate vector of the form to the aggregate vectors of the set of form types.

3. The computerized method of claim 1, wherein narrowing the set of input key-standard key pairs using a narrowing rule includes:
   modifying an input key of the set of input key-standard key pairs using the narrowing rule;
   identifying a standard key of the set of input key-standard key pairs that matches the modified input key; and
   removing a subset of input key-standard key pairs that include the input key modified by the narrowing rule from the set of input key-standard key pairs based on identifying the standard key that matches the modified input key.

4. The computerized method of claim 3, wherein modifying the input key using the narrowing rule includes at least one of the following: removing punctuation from the input key, changing whitespace in the input key, and removing whitespace from the input key.

5. The computerized method of claim 1, wherein the set of form types includes at least one of the following: a standard set of form types and a customer-specific set of form types, wherein the form with which the received set of input key-value pairs is associated is associated with a customer of the customer-specific set of form types.

6. The computerized method of claim 1, wherein mapping each input key of the set of input key-value pairs to a standard key of the set of standard keys using at least the generated ranking scores of the narrowed set of input key-standard key pairs further includes:
   identifying standard keys of the narrowed set of input key-standard key pairs associated with highest ranking scores for each input key of the narrowed set of input key-standard key pairs;
   determining a subset of form types associated with the identified standard keys;
   selecting a form type of the determined subset of form types using the identified standard keys; and
   mapping the input keys to standard keys of the selected form type for which the associated ranking scores are the highest values.

7. The computerized method of claim 6, wherein selecting the form type of the determined subset of form types using the identified standard keys includes selecting the form type with which a largest quantity of identified standard keys are associated.

8. One or more non-transitory computer storage media having computer-executable instructions that, upon execution by a processor, cause the processor to at least:
   receive a set of input key-value pairs associated with a form;
   determine a subset of candidate form types from a set of form types using the set of input key-value pairs;
   obtain a set of standard keys associated with the determined subset of candidate form types;
   generate a set of input key-standard key pairs using the set of input key-value pairs and the obtained set of standard keys;
   narrow the set of input key-standard key pairs using a narrowing rule;
   generate ranking scores for each input key-standard key pair of the narrowed set of input key-standard key pairs using a trained model; and
   map each input key of the set of input key-value pairs to a standard key of the set of standard keys using at least the generated ranking scores of the narrowed set of input key-standard key pairs.

9. The one or more non-transitory computer storage media of claim 8, wherein determining the subset of candidate form types from the set of form types using the set of input key-value pairs includes:
   generating, using a trained form type model, key vectors of input keys of the set of input key-value pairs;
   aggregating the generated key vectors into an aggregate vector of the form;
   comparing the aggregate vector of the form to aggregate vectors of the set of form types; and
   selecting the subset of candidate form types from the set of form types based on the comparing of the aggregate vector of the form to the aggregate vectors of the set of form types.

10. The one or more non-transitory computer storage media of claim 8, wherein narrowing the set of input key-standard key pairs using a narrowing rule includes:
    modifying an input key of the set of input key-standard key pairs using the narrowing rule;
    identifying a standard key of the set of input key-standard key pairs that matches the modified input key; and
    removing a subset of input key-standard key pairs that include the input key modified by the narrowing rule from the set of input key-standard key pairs based on identifying the standard key that matches the modified input key.

11. The one or more non-transitory computer storage media of claim 10, wherein modifying the input key using the narrowing rule includes at least one of the following: removing punctuation from the input key, changing whitespace in the input key, and removing whitespace from the input key.

12. The one or more non-transitory computer storage media of claim 8, wherein the set of form types includes at least one of the following: a standard set of form types and a customer-specific set of form types, wherein the form with which the received set of input key-value pairs is associated is associated with a customer of the customer-specific set of form types.

13. The one or more non-transitory computer storage media of claim 8, wherein mapping each input key of the set of input key-value pairs to a standard key of the set of standard keys using at least the generated ranking scores of the narrowed set of input key-standard key pairs further includes:

identifying standard keys of the narrowed set of input key-standard key pairs associated with highest ranking scores for each input key of the narrowed set of input key-standard key pairs;

determining a subset of form types associated with the identified standard keys;

selecting a form type of the determined subset of form types using the identified standard keys; and mapping the input keys to standard keys of the selected form type for which the associated ranking scores are the highest values.

14. The one or more non-transitory computer storage media of claim 13, wherein selecting the form type of the determined subset of form types using the identified standard keys includes selecting the form type with which a largest quantity of identified standard keys are associated.

* * * * *